(12) United States Patent
Holt et al.

(10) Patent No.: US 9,790,974 B2
(45) Date of Patent: Oct. 17, 2017

(54) TWIST-IN-PLACE GROMMET CONNECTION ASSEMBLY

(71) Applicant: ILLINOIS TOOL WORKS INC., Glenview, IL (US)

(72) Inventors: Jason D. Holt, Lexington, KY (US); Ronald C. Owens, II, Lexington, KY (US); John D. Bisset, Hudsonville, MI (US); Eric B. Jipp, Lexington, KY (US); Troy S. Field, South Lyon, MI (US); Jeremy R. D. Tuttle, Dearborn, MI (US)

(73) Assignee: Illinois Tool Works Inc., Glenview, IL (US)

( * ) Notice: Subject to any disclaimer, the term of this patent is extended or adjusted under 35 U.S.C. 154(b) by 353 days.

(21) Appl. No.: 14/758,262

(22) PCT Filed: Dec. 30, 2013

(86) PCT No.: PCT/US2013/078346
§ 371 (c)(1),
(2) Date: Jun. 29, 2015

(87) PCT Pub. No.: WO2014/107437
PCT Pub. Date: Jul. 10, 2014

(65) Prior Publication Data
US 2015/0369269 A1    Dec. 24, 2015

Related U.S. Application Data

(60) Provisional application No. 61/748,202, filed on Jan. 2, 2013.

(51) Int. Cl.
*F16B 21/18* (2006.01)
*F16B 5/02* (2006.01)
(Continued)

(52) U.S. Cl.
CPC ............ *F16B 5/0241* (2013.01); *F16B 21/02* (2013.01); *F16B 37/042* (2013.01); *F16B 5/0258* (2013.01); *F16B 41/002* (2013.01)

(58) Field of Classification Search
CPC ........ F16B 5/0241; F16B 21/02; F16B 37/042
(Continued)

(56) References Cited

U.S. PATENT DOCUMENTS 5,871,319 A * 2/1999 Schneider ............. F16B 43/001
411/107
6,227,784 B1 * 5/2001 Antoine .................. F02B 77/00
411/11
(Continued)

FOREIGN PATENT DOCUMENTS

DE        19705413 A1    7/1997
DE     102004049886 A1    4/2006
(Continued)

OTHER PUBLICATIONS

ISR and WO for PCT/US2013/078346 dated Apr. 24, 2014.

*Primary Examiner* — Gary Estremsky
(74) *Attorney, Agent, or Firm* — Paul F. Donovan

(57) ABSTRACT

A connection assembly adapted for receipt of a male connection member at the interior of a grommet. The connection assembly includes a grommet of hollow construction including a first collar and a second non-circular collar disposed in spaced-apart relation from the first collar. An axial bore extends entirely through the grommet. A sleeve insert including a hollow stem extends into the axial bore so as to at least partially line the axial bore. A complementary retaining panel includes a substantially non-circular access opening adapted to receive the second collar in pass-through relation and to block the first collar against insertion. Upon rotation, the grommet is blocked against withdrawal through the access opening and the retaining panel is held securely in place.

17 Claims, 4 Drawing Sheets

(51) Int. Cl.
*F16B 21/02* (2006.01)
*F16B 37/04* (2006.01)
*F16B 41/00* (2006.01)

(58) Field of Classification Search
USPC .................................................. 411/353, 367
See application file for complete search history.

(56) References Cited

U.S. PATENT DOCUMENTS

| | | | |
|---|---|---|---|
| 6,280,132 B1 * | 8/2001 | Szczukowski | F02F 7/006 411/107 |
| 6,309,156 B1 * | 10/2001 | Schneider | F16B 41/002 411/107 |
| 7,229,061 B2 * | 6/2007 | Battig | F01D 25/243 248/677 |
| 7,658,579 B1 * | 2/2010 | Stewart | B60G 13/003 280/788 |
| 2002/0098063 A1 * | 7/2002 | Pinzl | F16B 37/042 411/544 |
| 2002/0172550 A1 | 11/2002 | Uhler et al. | |
| 2004/0035382 A1 * | 2/2004 | Kataoka | B21K 1/205 123/90.27 |
| 2010/0202851 A1 | 8/2010 | Rass et al. | |

FOREIGN PATENT DOCUMENTS

| | | |
|---|---|---|
| EP | 2218923 A2 | 8/2010 |
| WO | 9806917 A1 | 2/1998 |

* cited by examiner

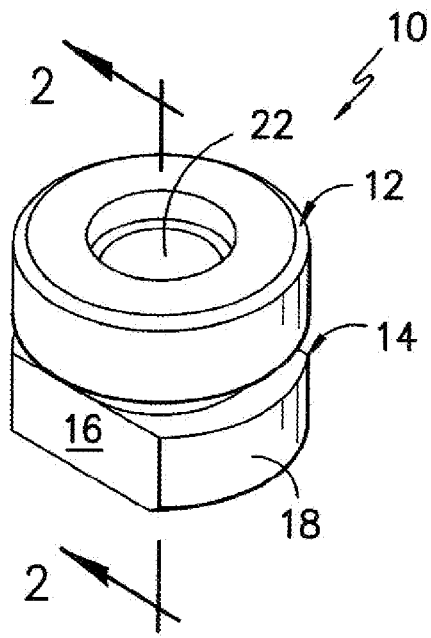
FIG. -1-
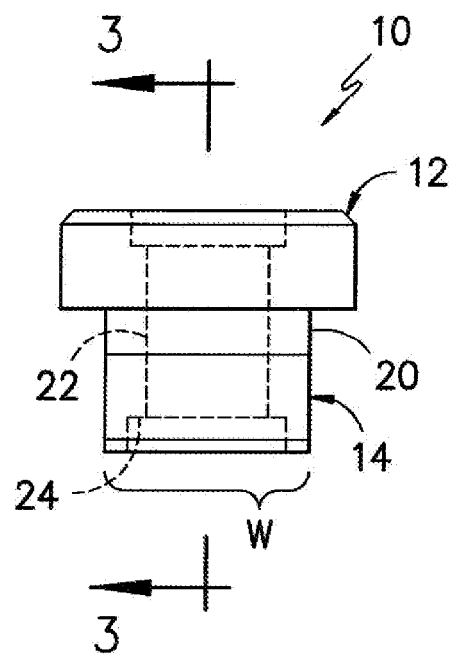
FIG. -2-
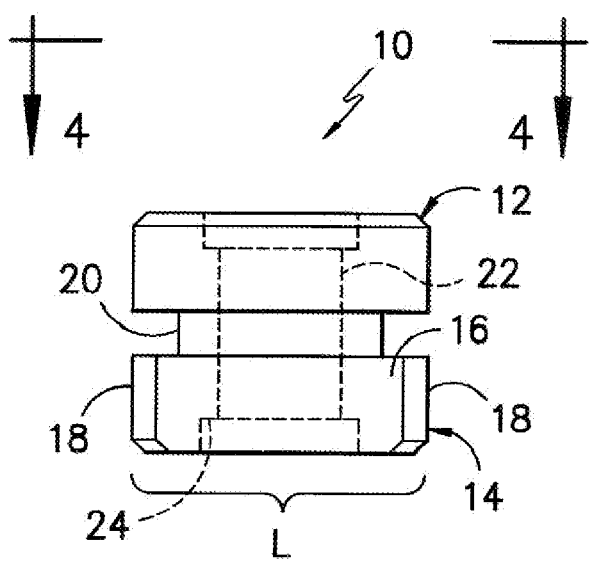
FIG. -3-
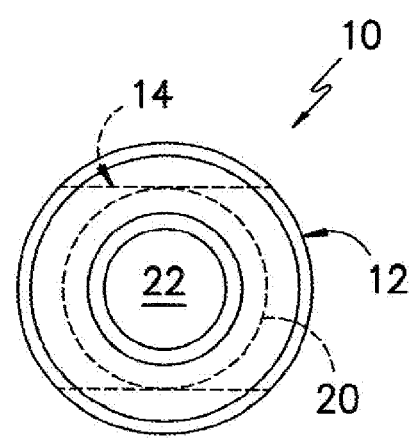
FIG. -4-

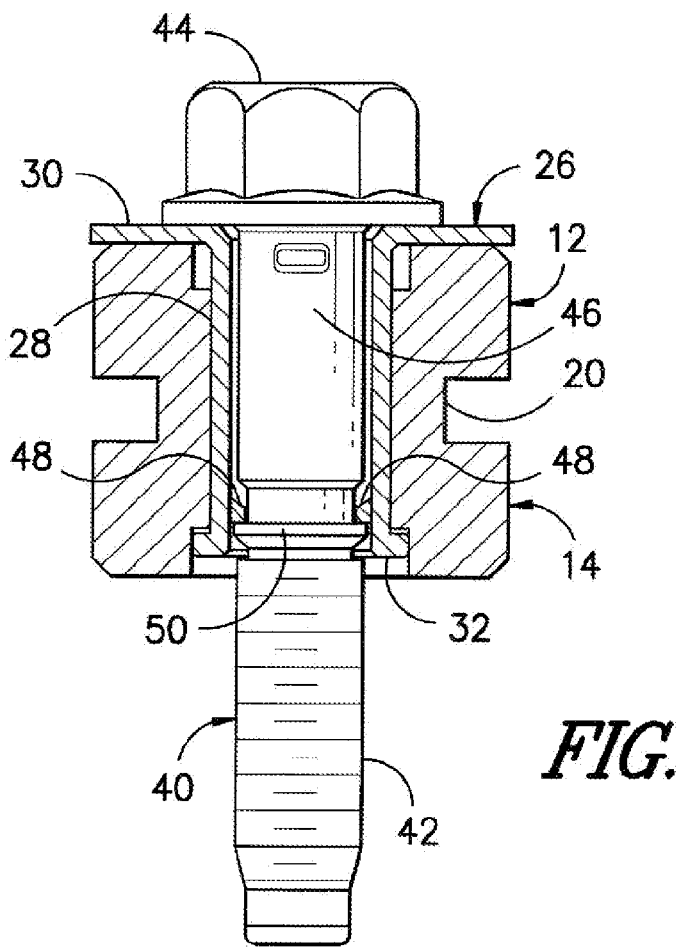
FIG. -5-
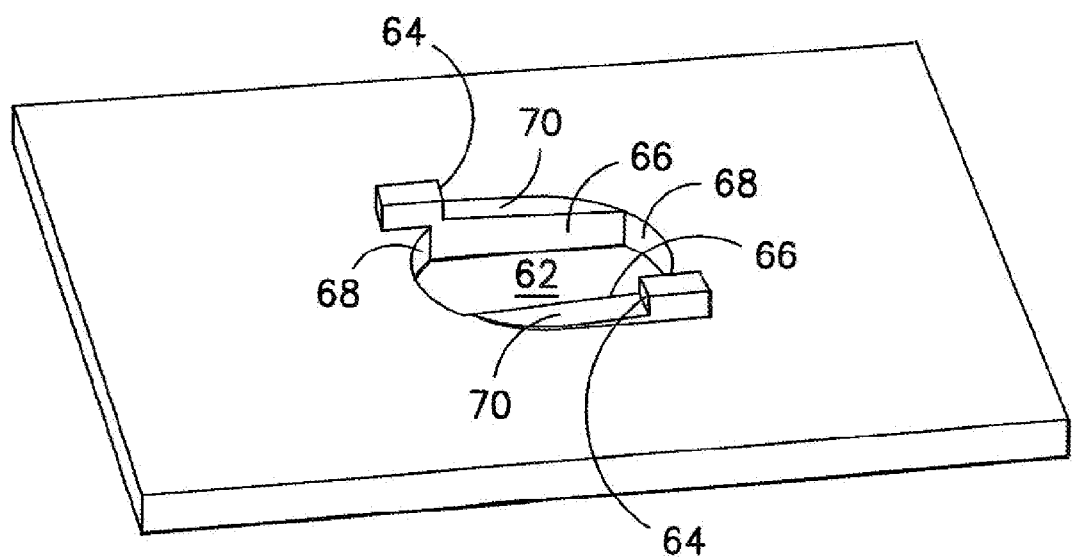
FIG. -6-

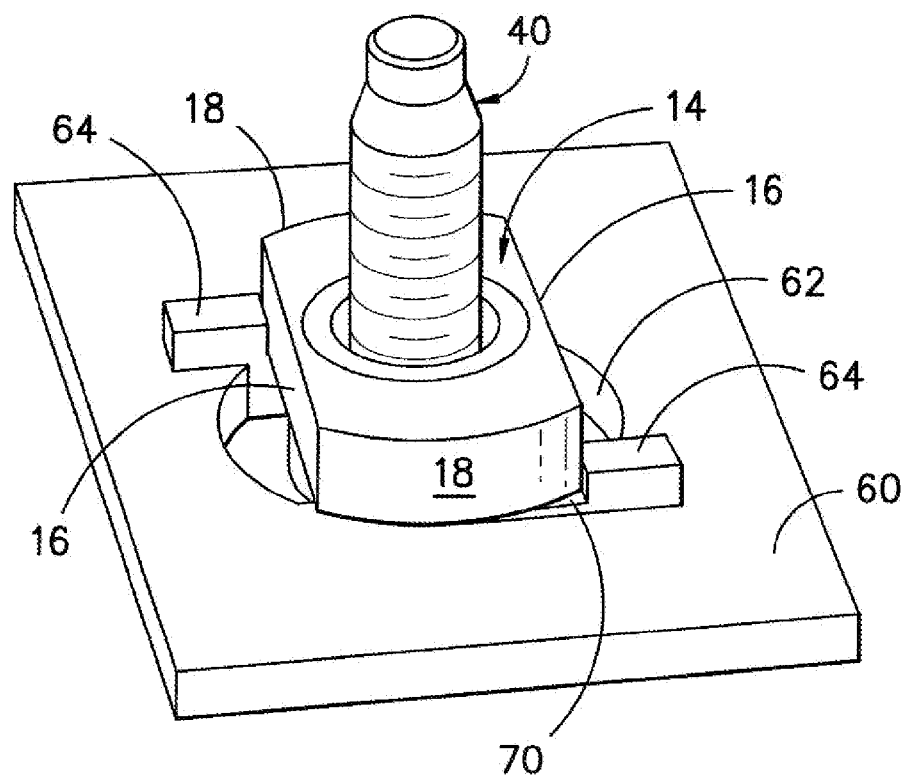
FIG. -7-
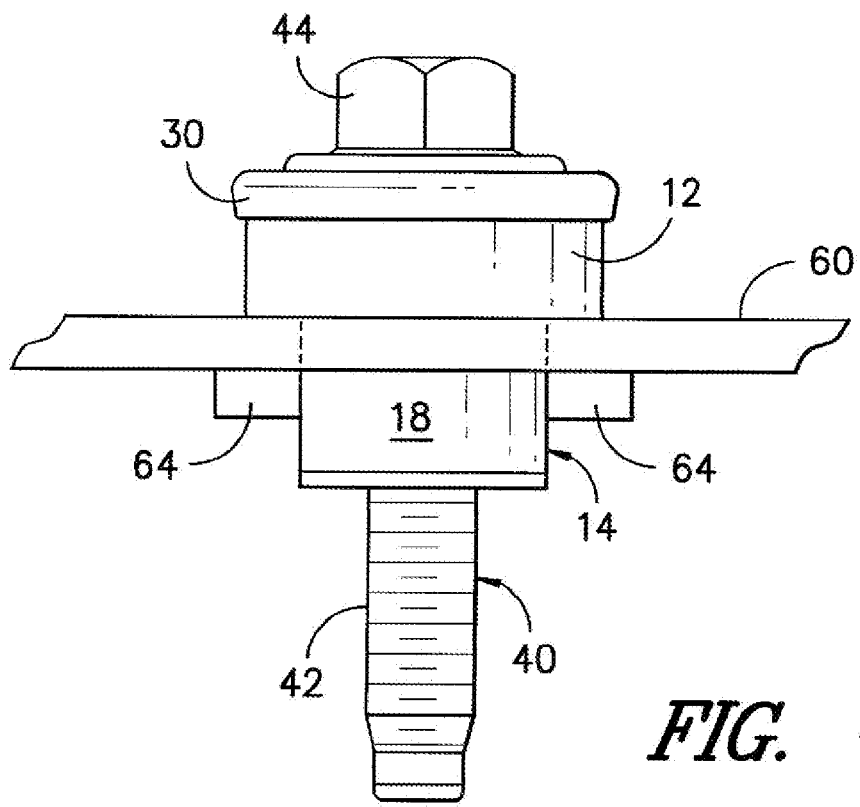
FIG. -8-

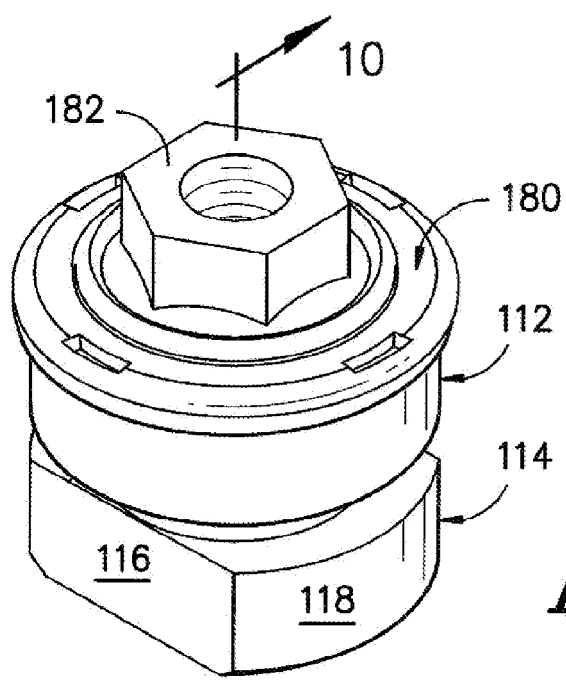
FIG. -9-
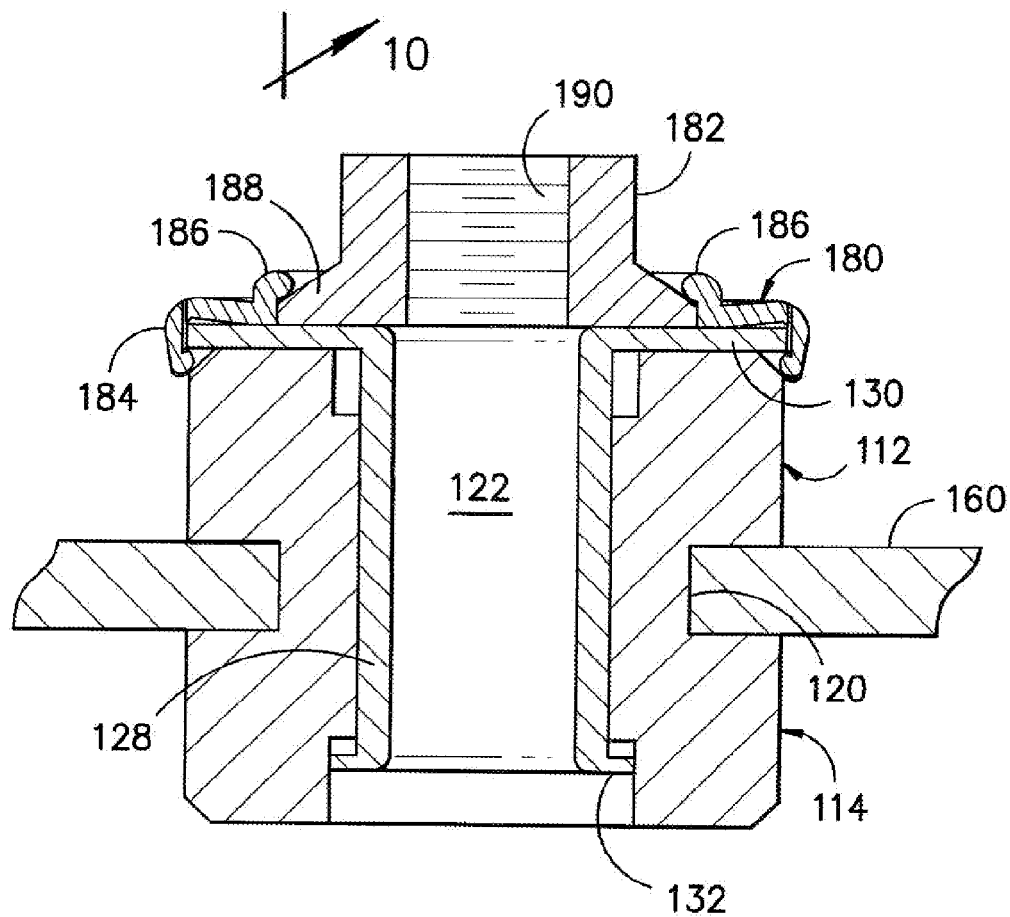
FIG. -10-

TWIST-IN-PLACE GROMMET CONNECTION ASSEMBLY

CROSS-REFERENCE TO RELATED APPLICATIONS

This application is a National Phase of International Application No. PCT/US2013/078346 filed Dec. 30, 2013 and claims the benefit of, and priority from, U.S. Provisional Application No. 61/748,202 filed Jan. 2, 2013. The contents of such provisional application and all other patent documents referenced in this application are hereby incorporated by reference in their entirety as if fully set forth herein.

TECHNICAL FIELD

The present disclosure relates generally to fasteners and, more particularly, the disclosure pertains to a connection assembly including a grommet which is lockable within a panel or other support structure. The grommet is installed and captured within the support panel and provides noise and vibration isolation on both sides of the structure

BACKGROUND

A covering structure such as a plastic engine cover or the like may be attached to an underlying substructure such as an engine block by passing elongated fasteners such as connection bolts or the like through openings in the covering structure for engagement with the substructure. In this regard, the elongated fasteners may extend either towards the substructure (i.e. away from the covering structure) or towards the covering structure (i.e. away from the substructure). It is known to use grommets of rubber or other resilient compressible material held within the openings of the covering structure for disposition in surrounding relation to the connection bolts. Such grommets are intended to prevent bolt movement and accompanying rattling.

As will be appreciated, in the manufacturing process, a covering structure may be produced at a location remote from the point of assembly to the substructure In known prior designs, the fasteners or fastening nuts are not captured within the covering structure prior to being shipped. Rather, prior designs typically require an individual user to manually attach the fastening components within the covering structure and to then attach the covering structure to the engine block or other substructure manually. During such manual assembly procedures, the typical practice has been to use grommets having relatively thin integral flanges at either end connected by a neck with an axial bore extending the length of the grommet. Such grommets are typically forced through a hole in the covering structure and then a metal stamping or bushing is pushed into the axial bore. An elongated fastening element such a threaded bolt or the like then may project through the stamping or bushing in connecting relation between the covering structure and the substructure. Such a practice provides good containment and vibration damping in many environments of use. However, in some instances, insertion of the traditional style grommets may be cumbersome due to the tight tolerances involved. This may be particularly problematic in the event that the covering structure is relatively fragile, since application of improper or excessive force may cause damage. Accordingly, an improved grommet construction and procedure of use may represent a desirable advancement over the known art.

SUMMARY

The present disclosure provides advantages and alternatives over the prior art by providing a grommet-based connection assembly adapted for ease of installation while maintaining desired sealing and vibration damping characteristics. The connection assembly includes a grommet of hollow construction including a first collar and a second non-circular collar disposed in spaced-apart relation from the first collar. An axial bore extends entirely through the grommet. A sleeve insert including a hollow stem extends into the axial bore so as to at least partially line the axial bore. A complementary retaining panel includes a substantially non-circular access opening adapted to receive the second collar in pass-through relation and to block the first collar against insertion. Upon rotation, the grommet is blocked against withdrawal through the access opening and the retaining panel is held securely in place. A connection assembly consistent with the present disclosure provides the added feature of damping isolation on both sides of the plastic component being attached with superior noise, vibration, and harshness reduction. Moreover, the subject connection assembly may provide a more robust fastening method with greater clamp-down force. The subject connection assembly may also provide substantial cost savings over previous attachment designs.

In accordance with one exemplary aspect, the present disclosure provides a connection assembly adapted for receipt of a male connection member at the interior of a grommet for operative attachment of retaining panel to a substructure. The connection assembly includes a grommet of hollow unitary construction formed from elastomeric material. The grommet includes a first collar having a first effective diameter and a second collar disposed in spaced-apart relation from the first collar. The second collar is of substantially non-circular geometry defining a second effective diameter. The grommet further includes a neck extending between the first collar and the second collar. An axial bore extends entirely through the grommet. A sleeve insert including a hollow stem extends from a point of insertion on one side of the grommet into the axial bore so as to at least partially line the axial bore. The sleeve insert further includes an annular flange extending radially outwardly away from the proximal end of the stem. The annular flange has a diameter greater than the axial bore at the point of insertion. The connection assembly further includes a retaining panel including a substantially non-circular access opening adapted to receive the second collar in pass-through relation when the second collar is aligned with the access opening. The access opening is adapted to block the first collar against pass-through insertion. Upon rotation of the grommet following insertion into the access opening, the grommet is blocked against withdrawal through the access opening and the retaining panel is held between the first collar and the second collar. In this condition, the second collar disposed in only partial surrounding relation to the access opening.

A method of establishing a connection using a grommet assembly consistent with the present disclosure is also provided. Other exemplary aspects and features will become apparent upon review of the following detailed description of potentially preferred embodiments and accompanying drawings.

BRIEF DESCRIPTION OF THE DRAWINGS

FIG. 1 is an elevation perspective schematic view illustrating an exemplary grommet consistent with the present disclosure;

FIG. 2 is a schematic cross-sectional view of the exemplary grommet of FIG. 1 taken generally along line 2-2 in FIG. 1;

FIG. 3 is a schematic cross-sectional view of the exemplary grommet of FIG. 1 taken generally along line 3-3 in FIG. 2;

FIG. 4 is a schematic plan view taken generally along line 4-4 in FIG. 3

FIG. 5 is a schematic cut-away view illustrating a first embodiment of an exemplary grommet assembly housing an elongated fastening element and illustrating interior features of the grommet and sleeve insert;

FIG. 6 is a schematic elevation perspective view illustrating the underside of an retaining panel consistent with the present disclosure with a set of positive stops for locking rotation of the exemplary grommet of FIG. 1 after insertion;

FIG. 7 is a schematic elevation perspective view illustrating locking engagement between the grommet assembly of FIG. 5 and the retaining panel of FIG. 6;

FIG. 8 is a schematic side view illustrating a final locking engagement between the grommet assembly of FIG. 5 and the retaining panel of FIG. 6; and FIG. 9 is a schematic view illustrating a second embodiment of an exemplary grommet assembly incorporating a captured flange nut secured to the exemplary grommet of FIG. 1; and FIG. 10 is a schematic cut-away view taken through the grommet assembly in FIG. 9 generally along line 10-10 illustrating interior features of the grommet with a retained stem and captured flange nut;

Before the embodiments of the disclosure are explained in detail, it is to be understood that the disclosure is not limited in its application to the details of construction or the arrangements of the components set forth in the following description or illustrated in the drawings. The disclosure is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof. Any dimensions are non-limiting and are exemplary only.

DETAILED DESCRIPTION OF PREFERRED EMBODIMENTS

Referring now to the drawings, and to FIGS. 1-4 in particular, it may be seen that the present disclosure provides a grommet 10 of rubber or other resilient material adapted to be held within a retaining element such as an engine cover or the like in a manner as will be described further hereinafter. In the illustrated exemplary construction the grommet 10 may have a unitary molded construction formed from a rubber compound such as NBR, SBR, EPDM or any other suitable elastomeric material as may be desired. As illustrated, the grommet 10 may have a spaced collar construction including an upper collar 12 of generally circular, annular configuration and a lower collar 14 with a substantially rectangular or lobe-shaped geometry such that it has a length dimension "L" (FIG. 3) which is greater than the width dimension "W" (FIG. 2).

As illustrated, in the exemplary construction the lower collar 14 has a generally lobe-shaped perimeter and includes a pair of opposing, substantially flat lateral sides 16 extending between a pair of opposing curved ends 18. As best seen in FIG. 3, the effective outer diameter of the lower collar 14 as defined by the length dimension "L" between the apex positions on the opposing curved ends 18 may be substantially equivalent to the outer diameter of the upper collar 12. Moreover, the curved ends 18 may be substantially aligned with the sides of the upper collar 12 with the arc of curvature of the curved ends 18 substantially matching the curvature of the upper collar 12. Thus, the upper collar 12 and the lower collar 14 may have substantially equivalent effective outer diameters.

In the illustrated exemplary construction the upper collar 12 and the lower collar 14 are spaced apart from one another by an integral hollow neck 20 with a substantially circular outer perimeter. As best seen through joint reference to FIGS. 2 and 3, in the exemplary construction the outer diameter of the neck 20 is less than the outer diameter of the upper collar 12 and less than the length dimension "L" of the lower collar 14. The upper collar 12, the lower collar 14 and the intermediate neck 20 may thereby form a generally "I" shaped length dimension profile along the lateral sides of the grommet 10 (FIG. 3). As best seen in FIG. 2, in the exemplary configuration, the outer diameter of the neck 16 may be substantially equivalent to the width dimension "W" of the lower collar 14 to define a generally "T" shaped length dimension profile at the ends of the grommet 10. Thus the profile of the grommet 10 is non-uniform.

In the illustrated exemplary construction, an axial bore 22 extends the full length of the grommet 10 passing through the upper collar 12, the neck 20 and the lower collar 14. As shown, the axial bore 22 may have a variable diameter along its length with slightly enhanced diameters adjacent the openings in both the upper collar 12 and the lower collar 14. In this construction, the enhanced diameter of the through axial bore 22 in the lower collar 14 defines a radial shoulder 24.

Referring now to FIG. 5, the grommet 10 is adapted to capture and retain a sleeve insert 26 such that the combination of the grommet 10 and the sleeve insert 26 defines a grommet assembly. The sleeve insert 26 may be formed from metal, structural plastic or other material as may be desired. Stamped metal such as steel or the like may be particularly desirable in many environments of use. As shown, in the illustrated exemplary construction, the sleeve insert may include a hollow stem 28 with an annular flange 30 surrounding the top or proximal end of the stem. The stem 28 of the sleeve insert 26 may include a flared lower end defining a radial lip 32 which engages the shoulder 24 at the interior of the grommet to block withdrawal of the stem 28 after it is pushed into the axial bore 22. In this regard, it will be understood that during insertion of the stem 28, the elastomeric material forming the grommet 10 may deform in a resilient manner to permit passage of the radial lip 32. Upon full insertion, the radial lip 32 will then snap behind the shoulder 24 such that withdrawal of the sleeve insert is substantially blocked.

As shown in FIG. 5, in accordance with one exemplary practice, a bolt 40 or other elongated fastening element may be inserted into the hollow stem 28 from an insertion position at one end of the grommet. By way of example only, and not limitation, the bolt 40 may include a threaded end 42, a tool-engaging head 44, and a non-threaded portion between the head and the threads. As illustrated, the stem 28 of the sleeve insert may include a radially inwardly projecting detent 48 adapted to snap behind an upper surface of an enhanced diameter ring 50 at the intersection between the threaded end and the non-threaded portion of the bolt. In this condition, the bolt 40 may be floatingly captured in the stem 28 such that it may be rotated with ease, but does not fall out. As will be appreciated, such an arrangement may facilitate pre-assembly of the bolt 40 with the grommet 10 for shipment to a point of final assembly.

FIG. 6 illustrates the underside of an exemplary retaining panel 60 such as an engine cover or the like adapted for use with the exemplary grommet assembly of FIGS. 1-5 in a manner consistent with the present disclosure. As shown, the exemplary retaining panel includes an access opening 62 in the form of a slotted hole having a size and shape corresponding substantially to the perimeter of the lower collar 14 of the grommet 10. As shown, the underside of the retaining panel may also be provided with a pair of molded-in raised stops 64 disposed in substantially diagonal relation to one another on opposite sides of the access opening 62. In the illustrated exemplary construction, the raised stops are oriented approximately 180 degrees from one another at positions generally at the intersections between substantially straight lateral sides 66 and curved ends 68. In the illustrated exemplary construction, lead-in ramps 70 may extent generally along the edges of the lateral sides 66. In this construction the elevation of the lead-in ramps 70 progressively increases as they approach the raised stops 64.

Referring now jointly to FIGS. 6-8, it will be understood that during use, the lower collar 14 may be inserted in substantially aligned relation into the access opening 62 in the retaining panel 60 until further insertion is blocked by the interference between the retaining panel 60 and the upper collar 12 due to the inability of the upper collar 12 to enter the access opening. As will be appreciated, once the lower collar 14 has been inserted, the retaining panel 60 is disposed in sandwiched relation between the upper collar 12 and the lower collar 14 and the neck 20 is disposed at the interior of the access opening 62.

In the initial aligned insertion condition, the grommet 10 remains rotatable relative to the retaining panel 60. Thus, following insertion of the lower collar 14 into the access opening 62, the grommet 10 may be rotated relative to the retaining panel 60 to form a locking engagement (FIG. 7). In this locked condition, with the grommet rotated approximately 90 degrees, a blocking relation is established thereby preventing outward withdrawal through the access opening 62. The raised stops 64 may promote a proper degree of relative rotation while avoiding the possibility of over-rotation.

As illustrated in FIG. 7, in the locked condition the lower collar 14 is disposed in only partial surrounding relation to the access opening 62. However, the upper collar 12 may be disposed in substantially full covering relation to the access opening 62 due to its larger diameter. In the exemplary construction, the lead-in ramps 70 promote tightening as rotation takes place thereby placing the upper collar 12 and the lower collar 14 into a state of compression against the retaining panel 60 and further enhancing a secure engagement between the grommet 10 and the retaining panel 60.

Referring now jointly to FIGS. 5 and 8, it will be understood that the establishment of the secure connection between the grommet 10 and the retaining panel 60 does not restrict rotation of the bolt 40. Thus, the bolt 40 may readily engage an underlying substructure (not shown) such as an engine block in mating bolted relation in a manner as will be well known to those of skill in the art.

As indicated previously, it is also contemplated that a grommet assembly consistent with the present disclosure may be adapted to support a female connection member such as a receiving nut or the like rather than the bolt as previously illustrated. Referring now to FIGS. 9 and 10, a second embodiment consistent with the present disclosure is illustrated wherein elements corresponding to those described previously are designated by like reference numerals within a 100 series. As will be understood, in this exemplary embodiment, the grommet 110 and the sleeve insert 128 may have substantially the same structure as previously described. However, a substantially annular retainer 180 of elastomeric material may secure a flange nut 182 in place in substantially coaxial relation to the axial bore 122. In particular, in the illustrated exemplary construction, the annular retainer 180 may include a hooking edge 184 adapted to hook under the perimeter of the flange 130. A deformable compression foot 186 is disposed along the inner diameter of the retainer and is adapted to act in continuous biasing relation against a flared base 188 of the flange nut 182.

As will be readily appreciated, in the illustrated arrangement, the axial channel 190 in the flange nut is arranged in substantially aligned relation to the axial bore 122. Accordingly, a male connection member such as a bolt or the like (not shown) may extend upwardly through the sleeve insert and into the flange nut 182 to engage threads therein. In this arrangement, the flange nut 182 can nonetheless be rotated relative to the deformable compression foot of the annular retainer 180 as may be desired to establish a connection with the male member.

While various spatial and directional terms, such as upper, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Of course, variations and modifications of the foregoing are within the scope of the present disclosure. It is understood that the disclosure which is disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

What is claimed is:

1. A connection assembly adapted for receipt of a male connection member at the interior of a grommet for operative attachment of retaining panel to a substructure, the connection assembly comprising:
   a variable profile grommet of hollow unitary construction formed from elastomeric material comprising a first collar having a first effective diameter, a second collar disposed in spaced-apart relation from the first collar, the second collar being of substantially non-circular geometry defining a second effective diameter, the grommet further comprising a neck extending between the first collar and the second collar, and wherein an axial bore extends entirely through the grommet;
   a sleeve insert comprising a hollow stem extending from a point of insertion on one side of the grommet into the axial bore so as to at least partially line the axial bore, the stem comprising a proximal end and a distal end, the sleeve insert further comprising an annular flange extending radially outwardly away from the proximal end of the stem, the annular flange having a diameter greater than the axial bore at the point of insertion;
an elongate bolt projecting into the stem, the bolt including a head disposed in overlying relation to the first collar and a distal end projecting outwardly beyond the second collar; and
a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held between the first collar and the second collar with the second collar disposed in partial surrounding relation to the access opening;
wherein the sleeve insert further comprises a radially inwardly projecting detent adapted to hold the bolt within the sleeve insert.

2. A connection assembly adapted for receipt of a male connection member at the interior of a grommet for operative attachment of retaining panel to a substructure, the connection assembly comprising:
a variable profile grommet of hollow unitary construction formed from elastomeric material comprising a first collar having a first effective diameter, a second collar disposed in spaced-apart relation from the first collar, the second collar being of substantially non-circular geometry defining a second effective diameter, the grommet further comprising a neck extending between the first collar and the second collar, and wherein an axial bore extends entirely through the grommet;
a sleeve insert comprising a hollow stem extending from a point of insertion on one side of the grommet into the axial bore so as to at least partially line the axial bore, the stem comprising a proximal end and a distal end, the sleeve insert further comprising an annular flange extending radially outwardly away from the proximal end of the stem, the annular flange having a diameter greater than the axial bore at the point of insertion;
a flange nut disposed in aligned relation to the axial bore in overlying relation to the first collar; and
a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held between the first collar and the second collar with the second collar disposed in partial surrounding relation to the access opening;
wherein an annular retainer ring extends between the annular flange and a flared distal base of the flange nut.

3. The connection assembly as recited in claim 2, wherein the annular retainer ring includes an outer perimeter hooking edge adapted for hooking engagement beneath the annular flange and an inner perimeter compression foot adapted to press the flared distal base towards the annular flange.

4. A connection assembly adapted for receipt of a male connection member at the interior of a grommet for operative attachment of retaining panel to a substructure, the connection assembly comprising:
a variable profile grommet of hollow unitary construction formed from elastomeric material comprising a first collar having a first effective diameter, a second collar disposed in spaced-apart relation from the first collar, the second collar being of substantially non-circular geometry defining a second effective diameter, the grommet further comprising a neck extending between the first collar and the second collar, and wherein an axial bore extends entirely through the grommet;
a sleeve insert comprising a hollow stein extending from a point of insertion on one side of the grommet into the axial bore so as to at least partially line the axial bore, the stem comprising a proximal end and a distal end, the sleeve insert further comprising an annular flange extending radially outwardly away from the proximal end of the stem, the annular flange having a diameter greater than the axial bore at the point of insertion; and
a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held between the first collar and the second collar with the second collar disposed in partial surrounding relation to the access opening;
wherein the axial bore has a variable diameter along its length with a first diameter within the neck and a second, greater diameter within the second collar to define a shoulder within the second collar.

5. The connection assembly as recited in claim 4, wherein the axial bore has a substantially "I" shaped cross section.

6. The connection assembly as recited in claim 4, wherein the distal end of the stem comprises a radially outwardly projecting lip having a diameter greater than the axial bore within the neck, the lip being held in underlying relation to the shoulder within the second collar when the stem is in an inserted condition within the grommet.

7. A connection assembly adapted for receipt of a male connection member at the interior of a grommet for operative attachment of retaining panel to a substructure, the connection assembly comprising:
a variable profile grommet of hollow unitary construction formed from elastomeric material comprising a first collar having a first effective diameter, a second collar disposed in spaced-apart relation from the first collar, the second collar being of substantially non-circular geometry defining a second effective diameter, the grommet further comprising a neck extending between the first collar and the second collar, and wherein an axial bore extends entirely through the grommet;
a sleeve insert comprising a hollow stem extending from a point of insertion on one side of the grommet into the axial bore so as to at least partially line the axial bore, the stem comprising a proximal end and a distal end, the sleeve insert further comprising an annular flange extending radially outwardly away from the proximal end of the stem, the annular flange having a diameter greater than the axial bore at the point of insertion; and
a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held between the first collar and the second collar with the second collar disposed in partial surrounding relation to the access opening;

wherein the stem extends in press-fit relation from a point of insertion on one side of the grommet into the axial bore and partially across the grommet so as to line the axial bore along substantially the full length of the neck.

8. A connection assembly adapted for receipt of a male connection member at the interior of grommet for operative attachment of retaining panel to a substructure, the connection assembly comprising:

a variable profile grommet of hollow unitary construction formed from elastomeric material comprising a first collar having a first effective diameter, a second collar disposed in spaced-apart relation from the first collar, the second collar being of substantially non-circular geometry defining a second effective diameter, the grommet further comprising a neck extending between the first collar and the second collar, and wherein an axial bore extends entirely through the grommet;

a sleeve insert comprising a hollow stem extending from a point of insertion on one side of the grommet into the axial bore so as to at least partially line the axial bore, the stem comprising a proximal end and a distal end, the sleeve insert further comprising an annular flange extending radially outwardly away from the proximal end of the stem, the annular flange having a diameter greater than the axial bore at the point of insertion; and a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held between the first collar and the second collar with the second collar disposed in partial surrounding relation to the access opening;

wherein the retaining panel comprises a pair of raised stops projecting away from the underside of the retaining panel at positions outboard from the access opening the raised stops being adapted to engage the second collar upon rotation of the grommet within the access opening.

9. The connection assembly as recited in claim 8, wherein the first collar is substantially circular and the second collar is characterized by a lobe-shaped perimeter with a pair of opposing substantially straight lateral sides and a pair of opposing convex curved ends.

10. The connection assembly as recited in claim 8, wherein the retaining panel further comprises a pair of molded-in ramps disposed along opposing perimeter edges of the access opening in adjacent relation to the raised stops.

11. A connection assembly adapted for receipt of a male connection member at the interior of a grommet for operative attachment of retaining panel to a substructure, the connection assembly comprising:

a variable profile grommet of hollow unitary construction formed from elastomeric material comprising a first collar having a first effective diameter, a second collar disposed in spaced-apart relation from the first collar, the second collar being of substantially non-circular geometry having a length dimension greater than a width dimension, the length dimension of the second collar defining a second effective diameter, the grommet further comprising a neck extending between the first collar and the second collar, the neck having a third effective diameter which is less than both the first and second effective diameters, and wherein an axial bore extends entirely through the grommet along a path extending through the first collar, the neck and the second collar;

a sleeve insert comprising a hollow stem extending in press-fit relation from a point of insertion on one side of the grommet into the axial bore and partially across the grommet so as to line the axial bore along the full length of the neck, the stem comprising a proximal end and a distal end, the distal end of the stem comprising a radially outwardly projecting lip having a diameter greater than the axial bore within the neck, the sleeve insert further comprising an annular flange extending radially outwardly away from the proximal end of the stem, the annular flange having a diameter greater than the axial bore at the point of insertion such that the annular flange limits insertion of the stem, the sleeve insert further including a radially inwardly projecting detent adapted to hold the male connection member within the stem while permitting relative rotation between the male connection member and the sleeve insert; and a retaining panel including a substantially non-circular access opening adapted to receive the second collar in pass-through relation when the second collar is aligned with the access opening, the access opening being further adapted to block the first collar against pass-through insertion, and wherein upon rotation of the grommet following insertion of the second collar, the grommet is blocked against withdrawal through the access opening and the retaining panel is held in surrounding relation to the neck between the first collar and the second collar with the second collar disposed in partial surrounding relation to the access opening.

12. The connection assembly as recited in claim 11, further comprising an elongate bolt projecting into the stem, the bolt including a head disposed in overlying relation to the first collar and a distal end projecting outwardly beyond the second collar and wherein the sleeve insert further comprises a radially inwardly projecting detent adapted to hold the bolt within the sleeve insert.

13. The connection assembly as recited in claim 11, further comprising a flange nut disposed in aligned relation to the axial bore in overlying relation to the first collar.

14. The connection assembly as recited in claim 13, wherein an annular retainer ring extends between the annular flange and a flared distal base of the flange nut and wherein the annular retainer ring includes an outer perimeter hooking edge adapted for hooking engagement beneath the annular flange and an inner perimeter compression foot adapted to press the flared distal base towards the annular flange.

15. A connection assembly adapted for receipt of a male connection member at the interior of a grommet for operative attachment of retaining panel to a substructure, the connection assembly comprising:

a variable profile grommet of hollow unitary construction formed from a rubber elastomeric material comprising a first collar having a substantially circular perimeter defining a first effective diameter, a second collar disposed in spaced-apart relation from the first collar, the second collar having a lobe-shaped perimeter with a pair of opposing substantially straight lateral sides and a pair of opposing convex curved ends, the second collar having a length dimension measured between opposing apex positions on the curved ends which is greater than a width dimension measured between opposing positions on the lateral sides, the length dimension of the second collar defining a second effective diameter which is substantially equivalent to the first effective diameter, the grommet further comprising a neck extending between the first collar and the second collar, the neck having a third effective diameter which is less than both the first and second effective diameters, and wherein an axial bore extends entirely through the grommet along a path extending through the first collar, the neck and the second collar; and a sleeve insert of metal comprising a hollow stem extending in press-fit relation from a point of insertion on one side of the grommet into the axial bore and partially across the grommet so as to line the axial bore along the full length of the neck, the stem comprising a proximal end and a distal end, the distal end of the stem comprising a radially outwardly projecting lip having a diameter greater than the axial bore within the neck, the sleeve insert further comprising an annular flange extending radially outwardly away from the proximal end of the stem, the annular flange having a diameter greater than the axial bore at the point of insertion such that the annular flange limits insertion of the stem, the sleeve insert further including a radially inwardly projecting detent adapted to hold the male connection member within the stem while permitting relative rotation between the male connection member and the sleeve insert; and a retaining panel including a substantially non-circular access opening of a size and shape substantially matching the perimeter geometry of the second collar and adapted to receive the second collar in pass-through relation when the second collar is aligned with the access opening, the access opening being further adapted to block the first collar against pass-through insertion, the retaining panel further including a pair of raised stops projecting away from the underside of the retaining panel at positions outboard from the access opening in adjacent relation to molded integral lead-in ramps, and wherein upon rotation of the grommet following insertion of the second collar, the second collar travels up the lead in ramps until at least one of the substantially straight lateral sides contacts at least one of the raised stops to define a locked condition, and wherein in the locked condition, the grommet is blocked against withdrawal through the access opening and the retaining panel is held in surrounding relation to the neck between the first collar and the second collar with the first collar and the second collar compressed against the retaining panel and with the second collar disposed in partial surrounding relation to the access opening.

16. The connection assembly as recited in claim 15, further comprising an elongate bolt projecting into the stem, the bolt including a head disposed in overlying relation to the first collar and a distal end projecting outwardly beyond the second collar and wherein the sleeve insert further comprises a radially inwardly projecting detent adapted to hold the bolt within the sleeve insert.

17. The connection assembly as recited in claim 15, further comprising a flange nut disposed in aligned relation to the axial bore in overlying relation to the first collar, wherein an annular retainer ring extends between the annular flange and a flared distal base of the flange nut and wherein the annular retainer ring includes an outer perimeter hooking edge adapted for hooking engagement beneath the annular flange and an inner perimeter compression foot adapted to press the flared distal base towards the annular flange.

\* \* \* \* \*